United States Patent [19]

Chee et al.

[11] Patent Number: 5,251,917

[45] Date of Patent: Oct. 12, 1993

[54] FIRE-RESISTANT SEAL

[75] Inventors: Wan T. Chee, Bellevue; Eric L. Aspinall, Federal Way, both of Wash.

[73] Assignee: The Boeing Company, Seattle, Wash.

[21] Appl. No.: 465,023

[22] Filed: Jan. 16, 1990

Related U.S. Application Data

[63] Continuation-in-part of Ser. No. 363,308, Jun. 6, 1989, abandoned, which is a continuation of Ser. No. 64,666, Jun. 22, 1987, abandoned.

[51] Int. Cl.$^5$ .............................................. F16J 15/02
[52] U.S. Cl. ........................... 277/228; 244/129.1; 244/131; 277/227; 277/230; 277/DIG. 6; 428/920
[58] Field of Search .......... 277/228, 229, 230, 227.26, 277/DIG. 6; 244/129.2, 129.1, 131, 133; 428/920

[56] References Cited

U.S. PATENT DOCUMENTS

| | | |
|---|---|---|
| 477,787 | 6/1892 | Snedekor . |
| 1,065,802 | 6/1913 | Hammestahr . |
| 1,372,478 | 3/1921 | Bradley . |
| 2,165,296 | 7/1939 | Oass . |
| 2,683,667 | 7/1954 | Utter . |
| 2,924,471 | 2/1960 | Poltorak et al. ................ 277/230 X |
| 2,978,363 | 4/1961 | Lofbich et al. . |
| 3,020,185 | 2/1962 | Moffitt, Jr. et al. ............ 277/229 X |
| 3,434,854 | 3/1969 | Voss . |
| 3,958,582 | 5/1976 | Nida . |
| 4,064,359 | 12/1977 | Peterson et al. . |
| 4,127,556 | 11/1978 | Ushitani et al. . |
| 4,219,203 | 8/1980 | Bellavia, Jr. et al. .......... 277/229 X |
| 4,246,304 | 1/1981 | Dixon . |
| 4,396,142 | 8/1983 | Lines, Jr. et al. . |
| 4,441,726 | 4/1984 | Uhl .................................... 277/230 |
| 4,690,859 | 9/1987 | Porter et al. .................... 428/920 X |
| 4,767,656 | 8/1988 | Chee et al. ................... 244/129.2 X |

FOREIGN PATENT DOCUMENTS

| | | |
|---|---|---|
| 690906 | 4/1953 | United Kingdom ............... 277/230 |
| 775092 | 5/1957 | United Kingdom . |

OTHER PUBLICATIONS

"Nextel Ceramic Fiber Products for High Temperature Applications," 3M Product Bulletin.
"Nextel 312 Woven Fabrics," 3M Product Bulletin.
"Nextel 312 Sewing Thread," 3M Product Bulletin.
"Flexible Heat-and-Pressure Seal," NASA Tech. Briefs, Fall 1979, vol. 4 No. 3.

*Primary Examiner*—Allan N. Shoap
*Attorney, Agent, or Firm*—Christensen, O'Connor, Johnson & Kindness

[57] ABSTRACT

A fire-resistant seal formed of an inner layer (20) of elastomer material that is compressible and flexible, a middle layer (22) of ceramic fiber that is fire resistant, and an outer layer (24) of elastic fabric. In the preferred embodiment, the ceramic fiber middle layer (22) totally encloses the elastomer inner layer (20), and the wear-resistant outer layer (24) totally encloses the middle layer (22) and the inner layer (20). In this particular application, the fire-resistant seal (10) has a toroidal-shaped compressible portion (12) and an integrally formed flange portion (14).

14 Claims, 1 Drawing Sheet

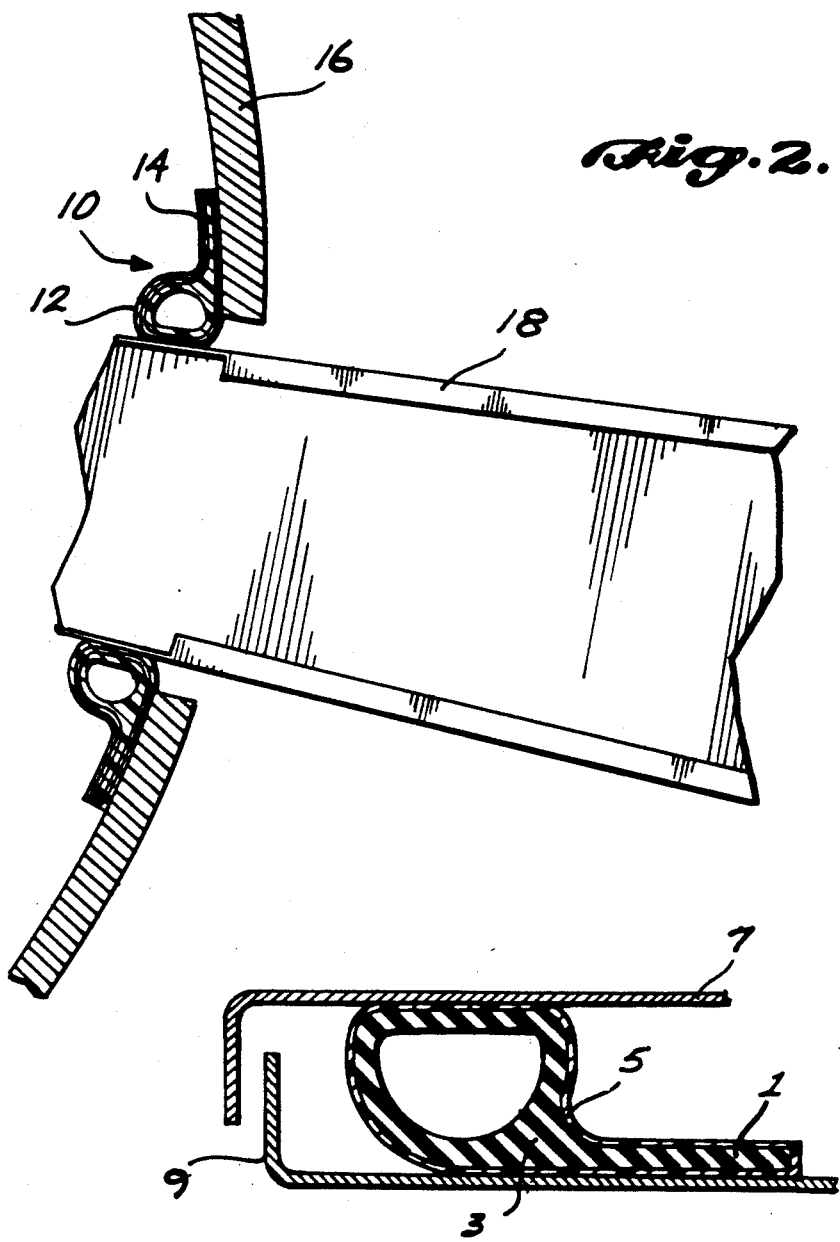
Fig. 2.
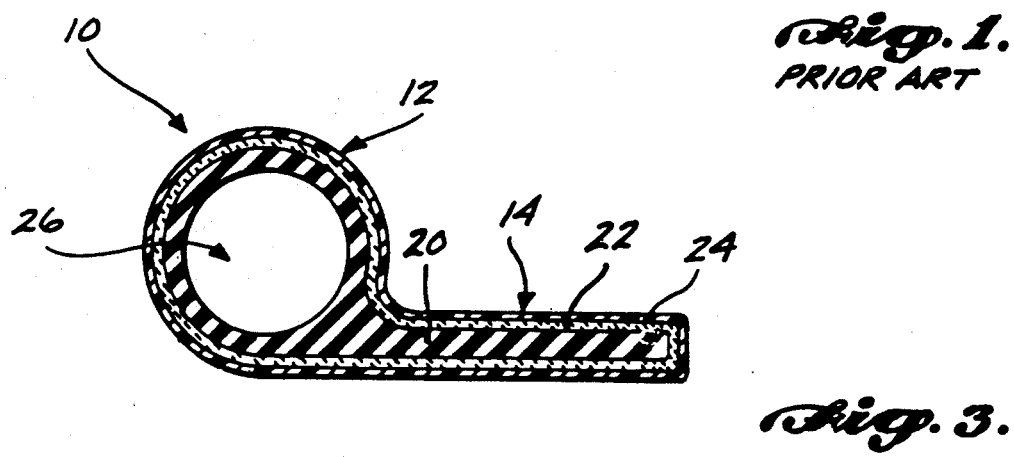
Fig. 1.
PRIOR ART
Fig. 3.

FIRE-RESISTANT SEAL

This application is a continuation-in-part application based on prior copending application Ser. No. 07/363,308, filed on Jun. 6, 1989, and now abandoned, which in turn is a continuation application based on prior application Ser. No. 07/064,666, filed on Jun. 22, 1987, and now abandoned.

TECHNICAL FIELD

The present invention relates to heat insulators and, more particularly, to a fire-resistant seal.

BACKGROUND OF THE INVENTION

Compressible and flexible fire-resistant seals are used in aircraft engines to maintain an effective heat and flame barrier in areas where there is relative movement between the aircraft engine nacelle and the engine support structure. Conventional seals are typically constructed of preformed elastomer sections with fabric protective covering. Because such materials are not fire resistant, prior seals have required overlapping metal flame shields to insure the seal's ability to contain fire in the designated zone. One prior art seal/shield configuration is shown in FIG. 1. FIG. 1 shows a fire seal 1, comprised of a core formed of an elastomeric material 3 and a fabric protective covering 5 compressed between a pair of flame shield members 7 and 9. In use, one of the flame shield members is attached to an aircraft engine frame and the other is attached to an airframe support structure.

The seal/shield configuration illustrated in FIG. 1 and described above is unsuitable for use on advanced technology prop fan engines because the structure for attaching these new engines to an airframe is designed to permit large deflections between the engine and the airframe in order to isolate continuous low-frequency vibrations. These deflections may be up to three inches compared to deflections on the order of one-half inch that prior engine configurations exhibited. Prior art seal/shield configurations of the type illustrated in FIG. 1 are unusable because when large deflections occur, the flame shield members 7 and 9 separate vertically and horizontally, allowing direct exposure of the seal 1 to high temperature flames. This results in a rapid breakdown of the seal and consequent damage to the engine support structure.

In order to adequately insulate the engine support structure, it is necessary to either use larger flame shields or develop a fire seal that withstands direct exposure to flames as well as accommodates relatively large deflections between the sealed structures. Because flame shields have the disadvantage of adding more weight and complexity to the engine nacelle, as well as increasing the cost, it is desirable to eliminate them. A fire-resistant seal formed in accordance with the present invention overcomes the aforementioned disadvantages and provides a lightweight, flexible barrier that withstands direct exposure to flames.

SUMMARY OF THE INVENTION

A fire-resistant seal for providing high temperature insulation and flame shielding is provided. The seal comprises a first layer constructed of an elastomeric material, a second layer constructed of an elastic ceramic fiber fire-resistant material, and a third layer constructed of an elastic abrasion-resistant material. Preferably, the second layer encloses the first layer, and the third layer encloses the second layer. In addition, it is preferred that the first and second layers and the second and third layers be bonded together. The seal comprises an integral compressible toroidal-shaped portion having a central portion constructed of elastomeric material and one or more outer layers. The compressible toroidal-shaped portion is able to withstand a large compression and to maintain its elastic properties after being subjected to such compression. Thus, the seal construction provides a structure that maintains a contact seal between structural members that experience large changes of position relative to each other due to stress and vibration during operation.

In accordance with other aspects of the present invention, the compressible toroidal-shaped portion is compressible up to 40 percent of its original shape. The central portion construction retains its elastic properties throughout the compressions and decompressions that occur during the sealing process.

In accordance with another aspect of the present invention, along with the compressible toroidal-shaped portion, the seal comprises a flange portion for attaching the seal between structural members in an aircraft engine. Preferably, the flange portion is integrally formed with the compressible toroidal-shaped portion.

In accordance with a further aspect of the present invention, the central portion of the compressible toroidal-shaped portion is hollow and is enclosed by one or more outer layers. Preferably, at least one or more of the seal outer layers is constructed of an elastic ceramic fiber.

As will be appreciated from the foregoing description, a fire-resistant seal formed in accordance with the present invention eliminates the additional weight and complexity that results from the use of metal flame shields. The addition of the ceramic fiber material permits construction of the fire-resistant seal having the same cross-sectional configuration as elastomeric seals now existing, as well as new cross-sectional configurations. Furthermore, no new fabrication techniques are required. The elimination of the metal flame shields results in a potential high cost reduction in the insulation of the aircraft engine nacelle and the engine support structure.

BRIEF DESCRIPTION OF THE DRAWINGS

The foregoing and other advantages and features of this invention will become more readily appreciated as the same becomes better understood by reference to the following detailed description when taken in conjunction with the accompanying drawings wherein:

FIG. 1 is a cross-sectional diagram of a prior art fire seal and metal flame shield combination;

FIG. 2 is a cross-sectional view of a fire-resistant seal formed in accordance with the invention in an aircraft engine nacelle; and FIG. 3 is an enlarged cross-sectional view of the fire-resistant seal shown in FIG. 2.

DETAILED DESCRIPTION OF THE PREFERRED EMBODIMENT

FIGS. 2 and 3 illustrate a preferred embodiment of a fire-resistant seal 10 formed in accordance with the present invention. The fire-resistant seal 10 illustrated in FIGS. 2 and 3 comprises a toroidal-shaped compressible portion 12 and a flange portion 14. Preferably the flange portion 14 is integrally formed with the compressible portion 12.

FIG. 2 shows a typical way of installing a fire-resistant seal 10 formed in accordance with the invention in the nacelle 16 of an aircraft engine about an engine support 18 that extends from the engine (not shown) to the aircraft (also not shown). The flange portion 14 is shown attached to the nacelle 16 by bonding, although riveting or other suitable means may be used. When properly installed, the fire-resistant seal 10 will be partially compressed as it presses against the aircraft engine support 18. Installation in this manner, i.e., with slight compression of the seal in the static position, insures that during movement between the nacelle 16 and the aircraft engine support 18 a constant heat and flame barrier will be maintained by the fire-resistant seal 10. Preferably, the static state compression is approximately 30 percent of the normal shape of the toroidal-shaped portion to maintain a good seal. This particular installation allows for large deflections between the nacelle 16 and the aircraft engine support 18 while maintaining an effective heat and flame barrier.

In practice, seal compression tolerance of between twenty and forty percent of the seal diameter is desirable for maintaining the necessary seal. Thus, the diameter of the compressible portion 12 is sized in part by the projected range of movement between the sealed structures. Not only the diameter but the shape of the compressible portion 12 changes to accommodate displacement of the nacelle towards and/or along the engine support. The construction of the seal according to the present invention is such that the compressible portion maintains its elastic qualities even after experiencing relatively large changes in compression.

FIG. 3 is a cross-sectional view showing that the fire-resistant seal 10 illustrated in FIG. 2 comprises three layers—an inner layer 20, a middle layer 22 and an outer layer 24. The inner layer 20 is preferably formed of an elastomer material that is compressible and flexible. The middle layer 22 is attached to the inner layer 20, preferably by bonding or vulcanizing. The middle layer 22 is constructed of a ceramic fiber material. One suitable ceramic fiber material is NEXTEL 312, a plain-weaved cloth or blanket, produced by the 3M Company, located in St. Paul, Minn. NEXTEL 312 ceramic fiber materials are capable of withstanding a temperature of over 3,000° for more than 15 minutes. This ability eliminates the need for the metal flame shields 7, 9 used in prior art seal/shield configurations of the type shown in FIG. 1 and described above.

The outer layer 24 is attached to the outer surface of the middle layer 22, preferably by bonding. Ideally, the outer layer 24 is constructed of DACRON, an elastomeric polyester cloth, or some other material having high abrasion resistance. This outer layer 24 acts as a protective cover to prevent wear of the middle layer 22 due to chafing or rubbing on the nacelle 16 or the aircraft engine support 18. The high abrasion resistance of outer layer 24 ensures that the seal is not prematurely worn due to high friction between the seal and the engine support.

As shown in FIG. 3, in one embodiment the toroidal-shaped compressible portion 12 has a hollow central portion 26 defined by the elastomer inner layer 20. The ceramic fiber material middle layer 22 totally encloses the elastomer inner layer 20. Likewise, the wear-resistant outer layer 24 totally encloses the middle layer 22 and the inner layer 20. This provides a fire seal that is totally enclosed and fire resistant on all sides.

Although the invention has been illustrated and described in the context of aircraft engines, it is to be understood that the fire-resistant seal can be used in any application where protection from direct exposure to flames or high temperatures is desired.

While preferred embodiments of the invention have been illustrated and described, it will be appreciated that various changes can be made therein without departing from the spirit and scope of the invention. For example, the hollow central portion may be partially or completely filled with a material to alter the compressibility of the toroidal-shaped portion. In addition, more or less than three layers of material may be used, depending on the nature and requirements of the application of the fire-resistant seal. In one actual embodiment, a steel backing angle is secured at the corner formed between the compressible portion 12 and the flange 14 to carry a portion of the load that is placed on the seal. The resulting rigidity at the corner of the seal does not affect the operation of the seal since the compressible portion 12 continues to be compressible to accommodate the displacement of the nacelle relative to the engine. Consequently, the invention can be practiced otherwise than as specifically described herein.

The embodiments of the invention in which an exclusive property or privilege is claimed are defined as follows:

1. A fire-resistant seal for providing high temperature insulation and flame shielding in aircraft engine nacelles, the seal comprising:
    (a) a first layer constructed of an elastomeric material defining an empty, hollow central portion;
    (b) a second layer bonded to said first layer and constructed of an elastic ceramic fiber material; and
    (c) a third layer bonded to said second layer and constructed of an elastic abrasion-resistant material, said layers creating a compressible toroidal shape that can be compressed without deterioration of its elastic properties and without said second and third layers separating from said first layer, whereby said seal maintains a constant contact seal between structural members that experience large deflections relative to one another.

2. The seal of claim 1, wherein said second layer encloses said first layer.

3. The seal of claim 2, wherein said third layer encloses said second layer.

4. The seal of claim 1, wherein said toroidal-shaped portion is compressible up to 40 percent of its original shape.

5. A fire-resistant seal for providing high temperature insulation and flame shielding in aircraft engine nacelles, the seal comprising:
    (a) an inner fill having an outside surface and an inner surface, said inner surface defining an empty hollow central portion, said inner fill constructed of an elastomer material;
    (b) an inner face sheet having an outside surface and an inside surface, said inside surface bonded to the outside surface of said inner fill, and said inner face sheet constructed of a ceramic fiber material; and
    (c) an outer cover bonded to the outside surface of said inner face sheet, said outer cover constructed of an elastic abrasion-resistant material, said inner fill, inner face and outer cover forming a compressible toroidal-shaped portion that can be compressed without deterioration of its elastic properties, whereby said seal maintains a constant contact seal between an aircraft engine nacelle and another engine member that experience large deflections relative to one another.

6. The seal of claim 5 wherein said inner face sheet encloses said inner fill.

7. The fire-resistant seal of claim 6, wherein said outer cover encloses said inner face sheet and said inner fill.

8. The fire-resistant seal of claim 5, wherein said toroidal-shaped portion is compressible up to 40 percent of its original shape.

9. A fire-resistant seal for providing high temperature insulation and flame shielding in an aircraft engine nacelle, the seal comprising:
 (a) a flange portion for attaching the seal to a structural member in the aircraft engine; and
 (b) a compressible toroidal-shaped portion having an inner core constructed of elastomeric material, said inner core defining an empty hollow central portion, and one or more outer layers, at least one of said one or more outer layers being constructed of an elastic ceramic fiber bonded to said inner core, said toroidal-shaped portion being compressible without deterioration of its elastic properties, whereby said compressible toroidal-shaped portion maintains contact with the structural members when the structural members change position relative to each other.

10. The fire-resistant seal of claim 9 wherein said flange portion is integrally formed with said compressible toroidal-shaped portion.

11. The fire-resistant seal of claim 9 wherein said inner core is enclosed by said one or more outer layers.

12. The fire-resistant seal of claim 11 wherein said one or more outer layers comprises an inner face sheet layer constructed of an elastic ceramic fiber that encloses said inner core, and an outer core constructed of an elastic abrasion-resistant material that is bonded to said inner face sheet and that encloses said inner face sheet and said inner core.

13. The fire-resistant seal of claim 9 wherein said toroidal-shaped portion is compressible up to 40 percent of its original shape.

14. An elastic seal for providing high temperature insulation, including an inner layer of elastomeric material, said inner layer defining an empty hollow central portion, and an outer layer of an elastic fabric, the improvement comprising:
 (a) a middle layer bonded between the inner layer and the outer layer, the middle layer constructed of an elastic ceramic fiber; and
 (b) a toroidal-shaped portion created from said layers, said toroidal-shaped portion being compressible without deterioration of the seal's elastic properties and without said second and third layers separating from said first layer, whereby said seal maintains a constant contact seal between structural members that experience large deflections relative to one another.

* * * * *